United States Patent
Loeffelsender et al.

(10) Patent No.: US 9,242,542 B2
(45) Date of Patent: Jan. 26, 2016

(54) SYSTEM FOR REDUCING ENGINE ROLL

(71) Applicant: Ford Global Technologies, LLC, Dearborn, MI (US)

(72) Inventors: Mark Loeffelsender, Niederkassel (DE); Christoph Meier, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/276,414

(22) Filed: May 13, 2014

(65) Prior Publication Data

US 2015/0008305 A1   Jan. 8, 2015

(30) Foreign Application Priority Data

Jul. 4, 2013 (DE) .......................... 10 2013 213 077

(51) Int. Cl.
*B60G 11/22* (2006.01)
*B60K 5/12* (2006.01)
*F16F 1/38* (2006.01)

(52) U.S. Cl.
CPC ............. *B60K 5/1241* (2013.01); *F16F 1/3821* (2013.01); *F16F 2226/04* (2013.01); *Y10T 29/49947* (2015.01)

(58) Field of Classification Search
CPC ...... F16F 1/3849; F16F 1/387; B60K 5/1241; B60K 5/1216; B60G 2204/14; B60G 2204/422
USPC ................................ 248/638; 267/292, 141.1
See application file for complete search history.

(56) References Cited

U.S. PATENT DOCUMENTS

| 8,967,599 | B2 * | 3/2015 | Yoneyama | B29C 45/14344 267/141.1 |
| 2009/0230601 | A1 * | 9/2009 | Lenda | F16F 1/371 267/141.1 |
| 2014/0151946 | A1 * | 6/2014 | Yokawa | F16F 1/3849 267/292 |

FOREIGN PATENT DOCUMENTS

| DE | 10235303 A1 | 2/2004 | | |
| EP | 1247678 A2 | 10/2002 | | |
| JP | WO 2012133383 A1 * | 10/2012 | ........ | B29C 45/14344 |
| JP | WO 2014103194 A1 * | 7/2014 | ........... | F16F 1/3849 |
| JP | WO 2014156495 A1 * | 10/2014 | ........... | B60K 5/1241 |
| KR | 101519285 B1 * | 5/2015 | ........... | B60K 5/1241 |
| WO | WO 2014093004 A1 * | 6/2014 | ........... | B60K 5/1241 |

* cited by examiner

*Primary Examiner* — Todd M Epps
(74) *Attorney, Agent, or Firm* — Julia Voutyras; Alleman Hall McCoy Russell & Tuttle LLP (57) ABSTRACT

A system for an engine torque support is described comprising a support member connected to a vehicle structure at a first end via a bearing comprising a bearing core surrounded by a bearing bush. The bearing bush has a recess, and the bearing core includes a receiving channel for a connector, a notch extending transversely relative to the receiving channel, and a connection web formed in a plane of the notch creating a first core portion, and a second core portion of the bearing core. The second core portion is spaced apart from the first core portion by the notch, and the second core portion is displaced relative to the first core portion via resilient deformation of the connection web and/or via breaking of the connection web.

19 Claims, 7 Drawing Sheets

SYSTEM FOR REDUCING ENGINE ROLL

CROSS REFERENCE TO RELATED APPLICATIONS

The present application claims priority to German Patent Application No. 102013213077.5, filed on Jul. 4, 2013, the entire contents of which are hereby incorporated by reference for all purposes.

TECHNICAL FIELD

The present description relates to a torque support for a drive motor.

BACKGROUND AND SUMMARY

Drive motors (or engines) may be prone to powerful pitch movements about drive shafts due to sudden changes in torque occurring during drive motor operation. A torque support may reduce pitch movements of the drive motor by coupling the drive motor to the vehicle structure. However, larger openings may be required in the vehicle chassis structure to accommodate pivot bearings used by torque supports (e.g., extruded profile-section). These larger openings may weaken the vehicle structure. Herein, stabilization measures may be used to support the vehicle structure leading to an overall increase in the weight of the vehicle and an increase in production costs.

One example approach to reducing the effect of torque supports on vehicle structure is shown by Schulze et al. in EP 1247678. Therein, a torque support comprising a support member and a bearing with two bearing cores is used. The bearing cores are spaced apart from each other such that each core is surrounded by annular resilient bearing bushes. A bearing unit is composed of each core with its surrounding bearing bush. One end of the support member has a through-hole and is arranged between the two bearing units such that the through-hole is aligned with openings in the bearing cores of the two bearing units. Accordingly, the support member is connected to the two bearing cores via a connector which is introduced through the openings and the through-hole. In this way, the torque support may be arranged in the plane of a connection region on the vehicle structure via the bearing units enabling additional space for surrounding components and reducing the size of openings in the vehicle structure.

However, the inventors herein have identified potential issues with such an approach. For example, since the bearing is composed of two bearing cores and two annular resilient bearing bushes, the number of components involved in manufacturing a torque support is increased. A larger number of components may add to the complexity of production and assembly, and may raise costs. Further, additional time may be needed when attaching the torque support to the vehicle structure to allow correct positioning of the support member between the two, separate bearing cores.

The inventors herein have recognized the above issue and identified an approach to at least partly address the issue. One example approach includes providing a torque support for a drive motor in a vehicle structure comprising a support member connected to the vehicle structure via a bearing comprising a bearing core surrounded by a bearing bush, the bearing bush having a recess, and the bearing core including a receiving channel for a connector, a notch extending transversely relative to the receiving channel, and a connection web formed in a plane of the notch creating a first core portion and a second core portion of the bearing core such that the second core portion is spaced apart from the first core portion by the notch and the second core portion can be displaced relative to the first core portion via resilient deformation of the connection web and/or via breaking of the connection web.

For example, a torque support may include a support member with a first end connected to a vehicle structure via a one-piece bearing, and a second end connected to a drive motor via an inner bearing. The one-piece bearing at the first end of the support member may comprise a resilient bearing bush encompassing a single bearing core. Further, the bearing bush may be configured with a recess on a side surface that provides access for the support member to a notch within the bearing core. Thus, the first end of the support member may be placed within the one-piece bearing through the recess in the bearing bush and into the notch in the bearing core. The notch may subdivide the single piece bearing core into three zones: a lower (or first) core portion, an upper (or second) core portion, and a connection web. The bearing core may also include a receiving channel that may be aligned with a through-hole at the first end of the support member. A connector may be placed in the receiving channel and the through-hole, and may be tightened to clamp the support member within the bearing core. Additionally, the connection web of the bearing core may be deformed, either in an elastic manner or a plastic manner, when the connector is tightened. Resilient deformation of the connection web allows relative displacement of the upper core portion and the lower core portion.

In this way, using a single bearing core fitted within a single bearing bush may reduce the number of components in a torque support providing a reduction in production costs and a decrease in assembly time. Additionally, orientation and alignment of the supporting member within the single bearing core may be achieved in a simpler and easier manner. Further, by creating two core portions (via the notch) that are displaceable relative to each other via resilient (and/or plastic) deformation, an improved clamping action of the support member may be accomplished which in turn may reduce engine roll more effectively.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Drive motors used in vehicles may be operated with either fuel or electrical energy. In one example, drive motors may be a combination of an internal combustion engine and/or an electric motor with a gear mechanism. Drive motors may have a rotationally driven output shaft. The torque present at the output shaft may be transmitted to at least one drive wheel in road vehicles. By the wheel rolling on the ground, the rotational movement may be ultimately converted into a linear movement of the vehicle. However, sudden changes in torque produced during operation may result in occasional powerful pitch movements of the drive motor about the drive shaft. Differential torque present between previously produced torque and current torque may be responsible for pitch movements of the drive motor.

To reduce the effect of drive motor pitch movements, the drive motor may be supported on the vehicle structure at a region spaced perpendicularly apart from the drive shaft via a torque support. The torque support may be a pendulum support that extends in the fitted state between the drive motor and the vehicle structure. In this manner, differential torque can be separated into a spacing between the output shaft and a connection region of the torque support on the vehicle structure.

The torque support may be coupled to the vehicle structure at a bodywork, a frame or an auxiliary frame of the vehicle. The drive motor itself may be supported at a small number of locations on the vehicle structure but may be largely spaced apart from the vehicle structure. Further, the torque support may be coupled to the drive motor and the vehicle structure such that transmission of vibrations is decreased.

Figure 1:
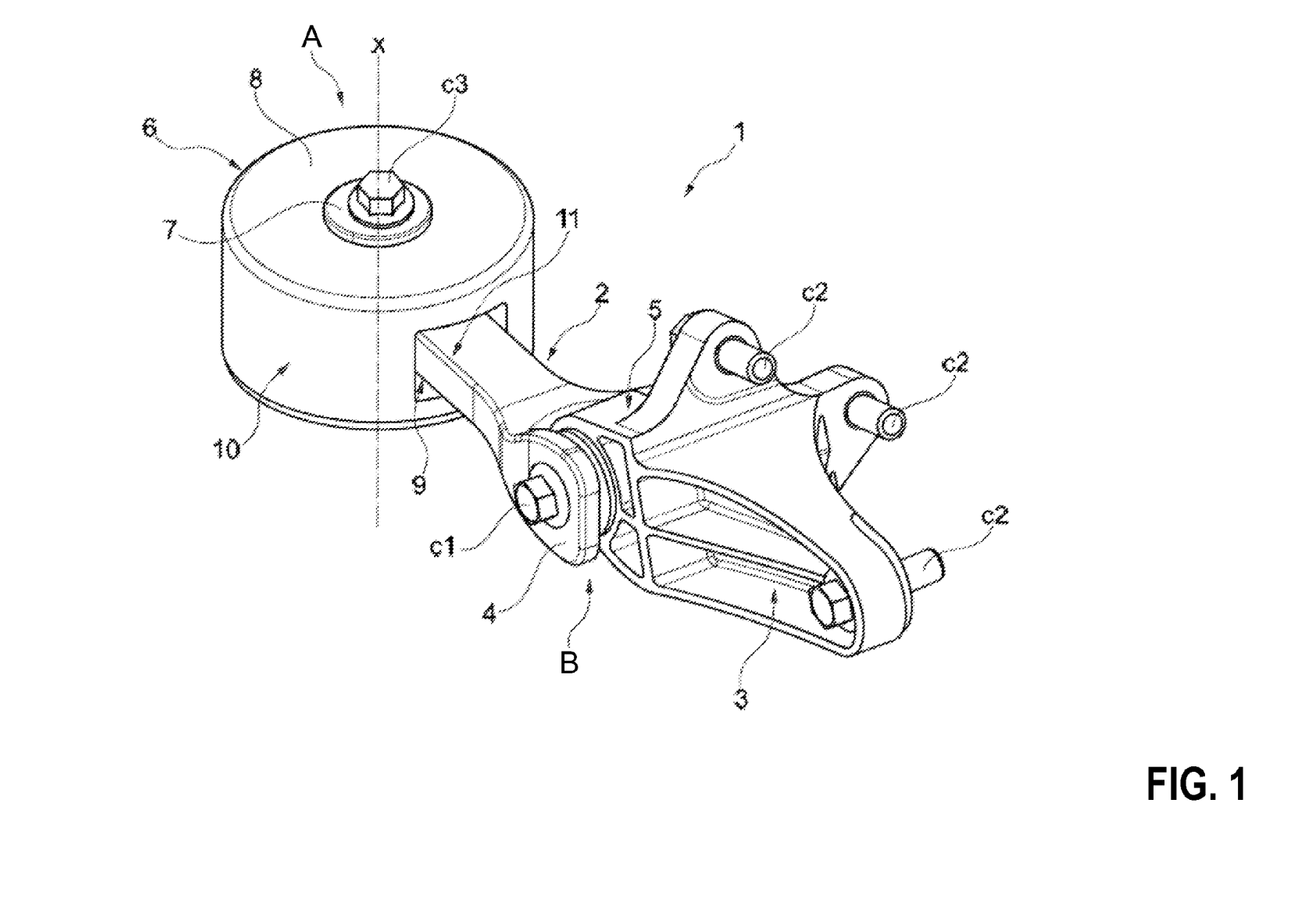
FIG. 1 is a perspective view of a torque support according to the present disclosure.
Figure 2:
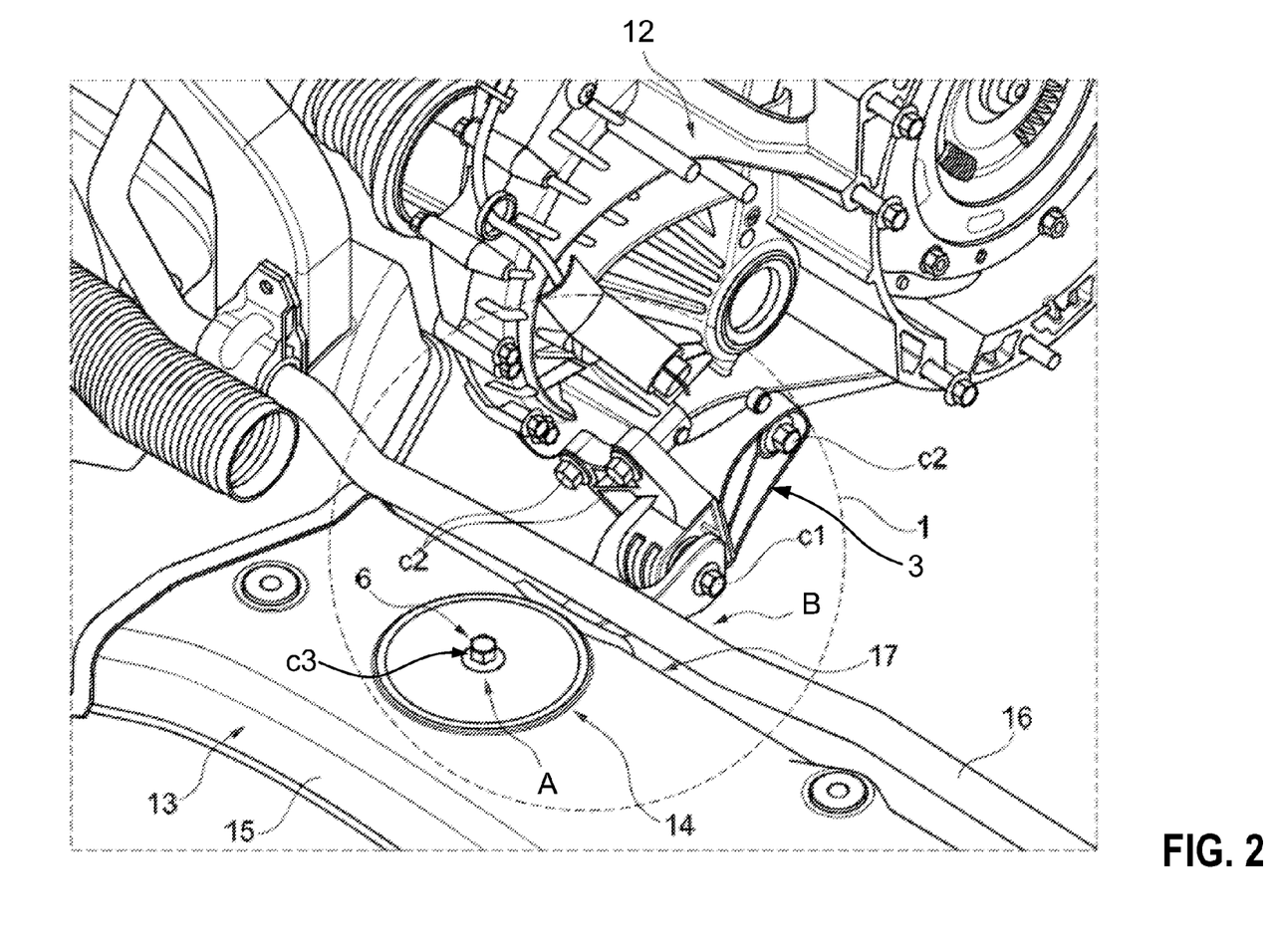
FIG. 2 is a perspective view of the torque support as connected to a drive motor and a vehicle structure.
Figure 4:
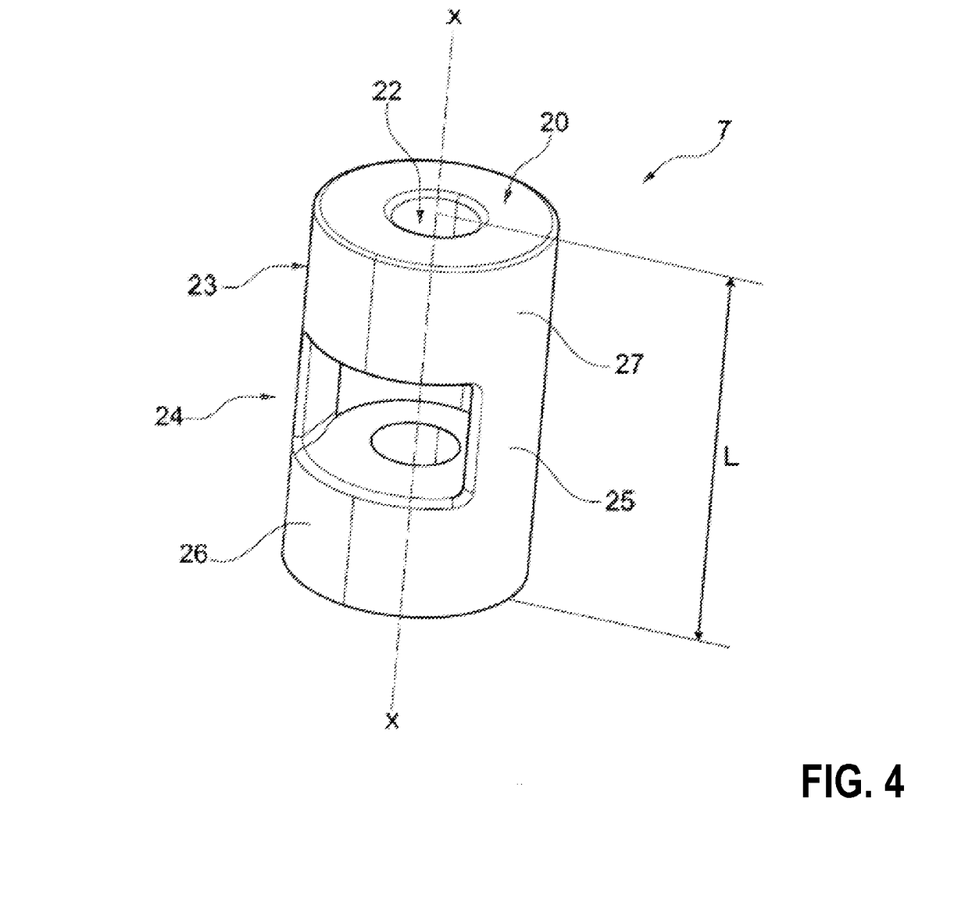
FIG. 4 is a perspective view of a bearing core of the torque support.
Figure 5:
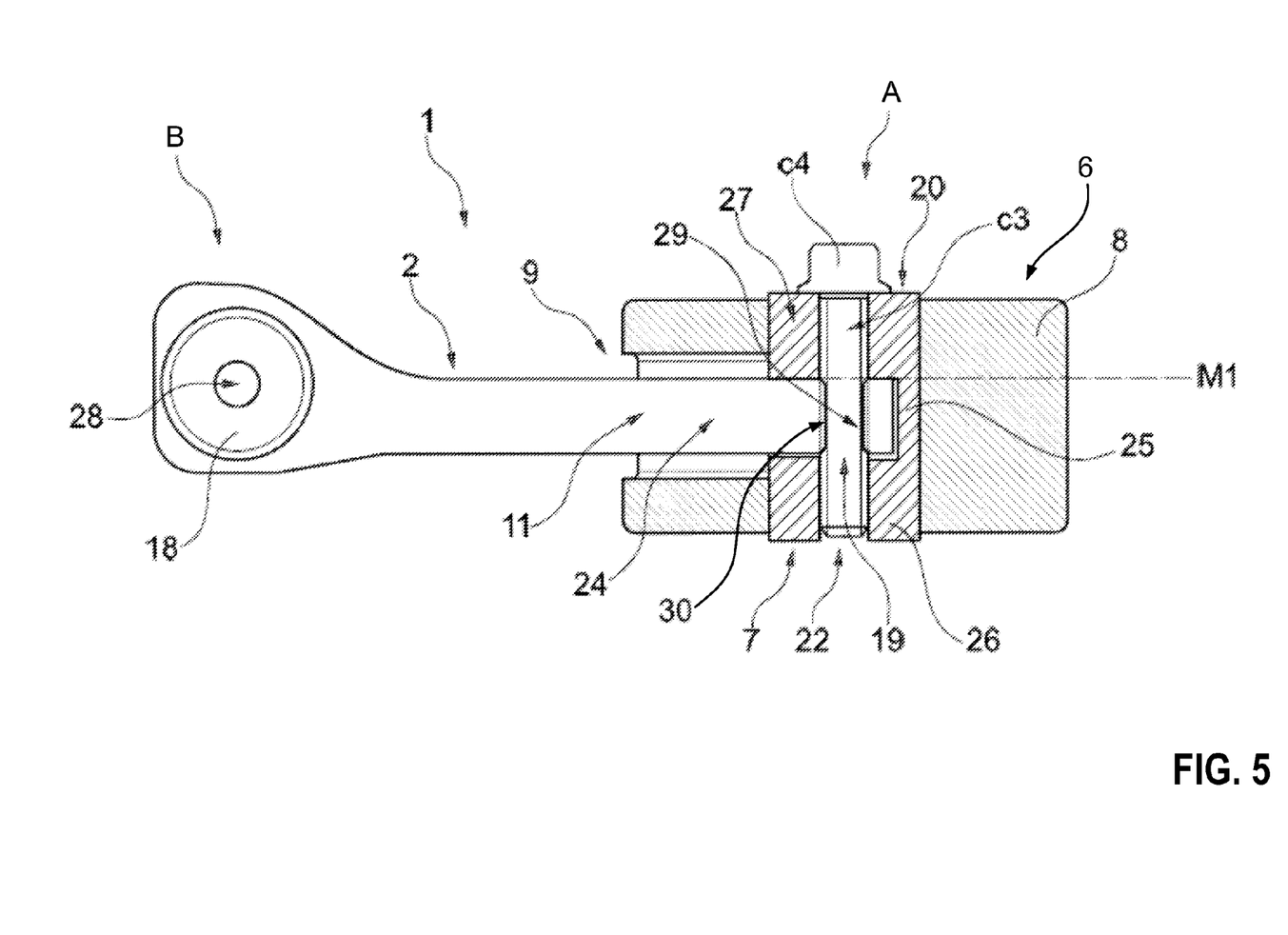
FIG. 5 is a side view of the torque support depicting a sectional perspective according to the present disclosure.
Figure 6:
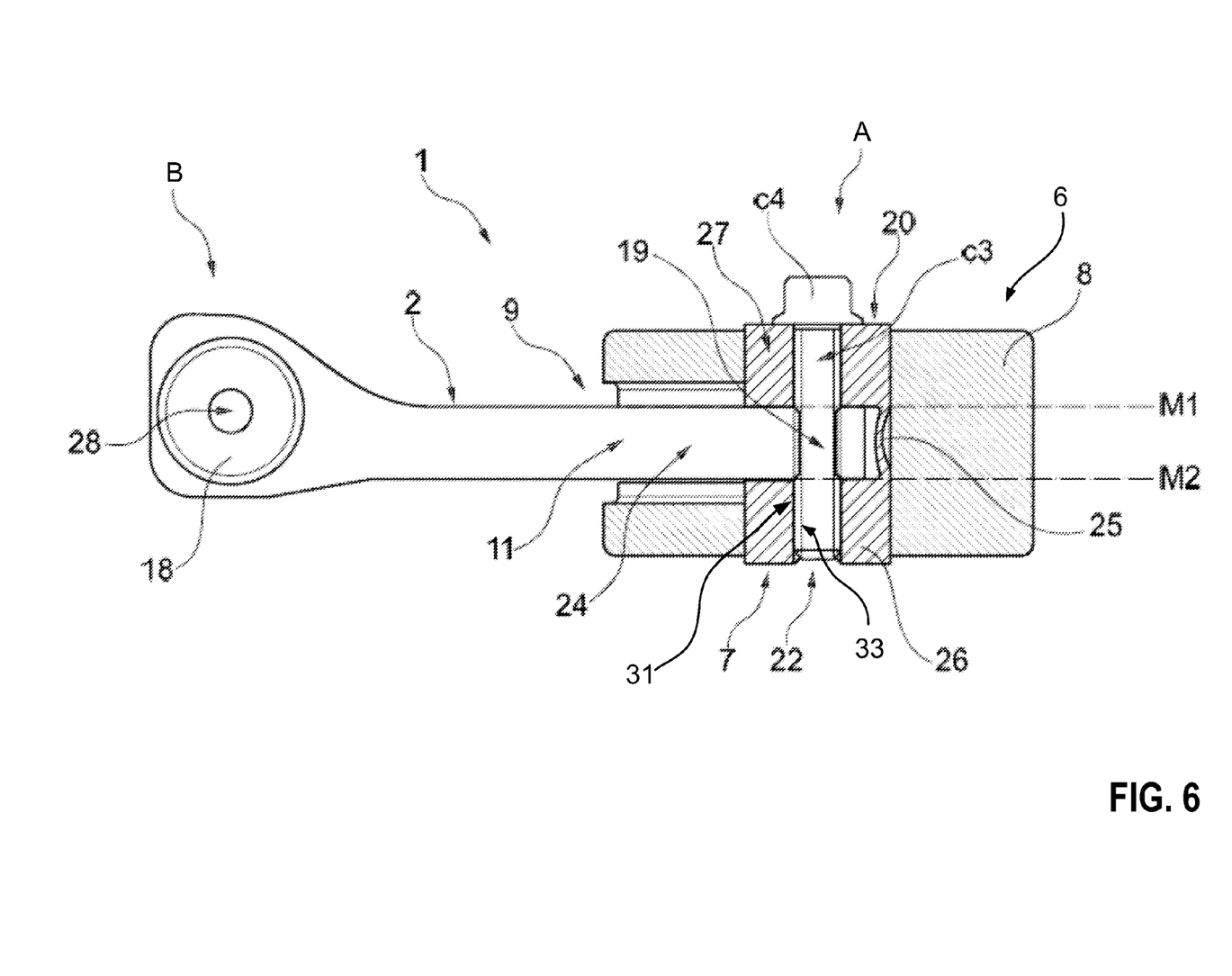
FIG. 6 is a side view of the torque support featuring a deformable connection web in the bearing core of FIG. 4 according to and the present disclosure.
Figure 7:
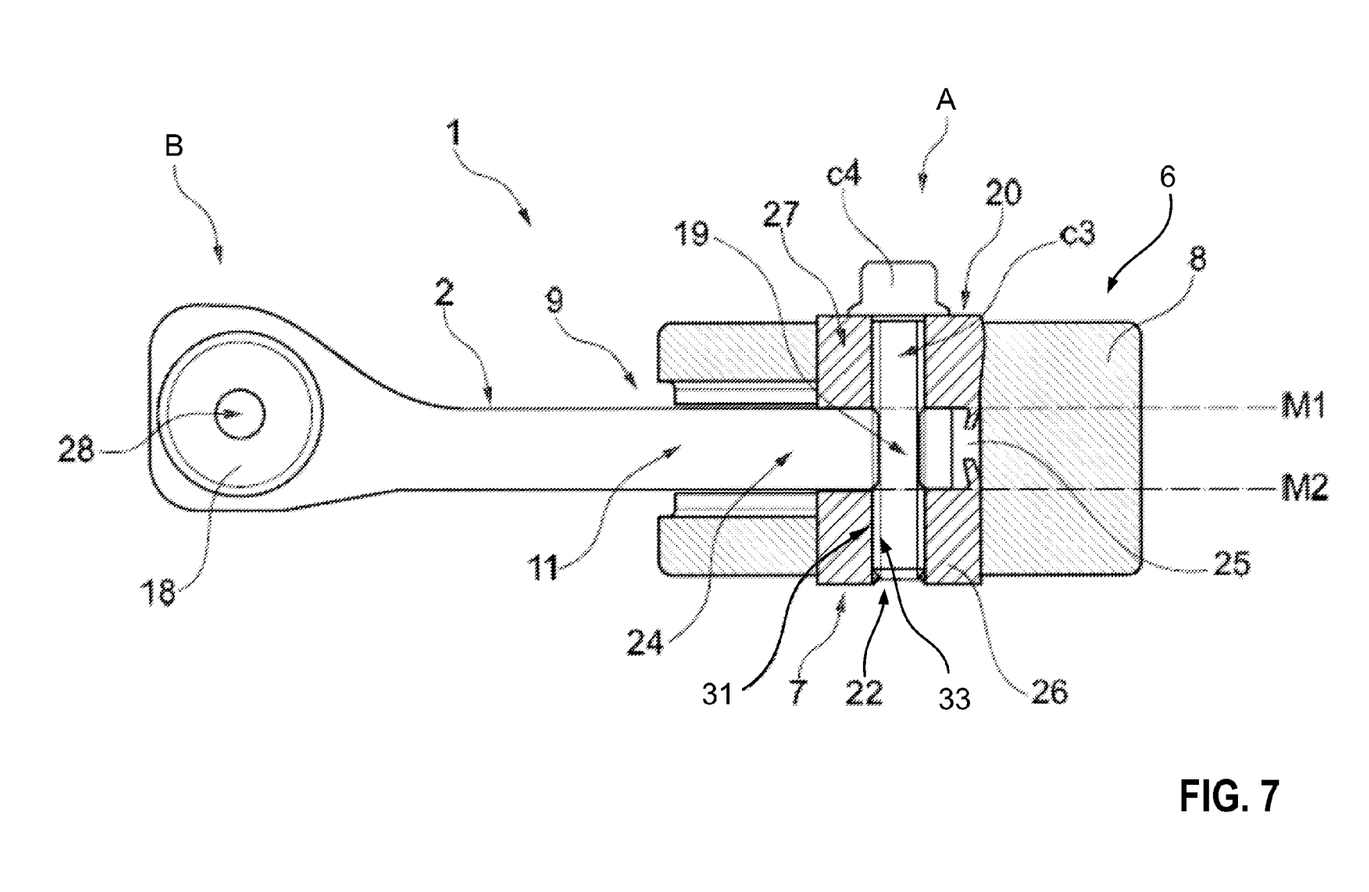
FIG. 7 is a side view of the torque support featuring a broken connection web in the bearing core of FIG. 4.

Thus, a torque support may be arranged in a vehicle between a drive motor and the vehicle structure as shown in FIG. 2. The torque support comprises a support member which may be coupled to the drive motor via an inner bearing and an attachment bracket (FIG. 1). Furthermore, the support member can be attached to the vehicle structure via a bearing shown in FIG. 3. The bearing comprises a bearing bush that surrounds an individual, one-piece bearing core (FIG. 4) which can be connected to the support member as shown in FIGS. 5, 6, and 7.

All drawings except FIG. 2 are drawn to scale. It will be understood that other embodiments fully embraced by this disclosure will admit other dimensions, features, etc.

FIG. 1 is a perspective view of a torque support 1 according to the present disclosure. Torque support 1 comprises a support member 2 having a first end "A" and a second end "B". Support member 2 may be connected to attachment bracket 3 via second end B. Attachment bracket 3 may attach torque support 1 to a drive motor (not shown in FIG. 1). The second end B of the support member 2 is U-shaped, and members 4 of second end B may be coupled to a region 5 of the attachment bracket 3 via an inner bearing (not shown in FIG. 1). Furthermore, in order to connect support member 2 with the attachment bracket 3, a releasable connector c1 may be arranged through members 4 and region 5 of the attachment bracket 3. Additional connectors c2 may link the attachment bracket 3 to the drive motor.

First end A of the support member 2 opposite second end B may be attached to a cylindrical bearing 6 via connector c3. Bearing 6 has a bearing core 7 which receives connector c3 that attaches bearing 6 to first end A of support member 2. Thus, connector c3 may be introduced into bearing core 7 in a longitudinal direction "x" of the bearing core 7. Bearing 6 also comprises a bearing bush 8 which may be in the form of an annular ring that encompasses bearing core 7. Further, bearing bush 8 may be made of resilient material. Bearing bush 8 extends as a peripheral ring about the longitudinal direction x of the bearing core 7. Further, bearing bush 8 has a recess 9 in wall 10 to allow first end A of the support member to be introduced into bearing 6. Thus, bearing core 7 is surrounded by resilient bearing bush 8 except in the region of recess 9. Recess 9 is constructed such that a connection portion 11 of support member 2 is afforded access via recess 9 as far as the bearing core 7 arranged within the bearing bush 8. Since bearing bush 8 covers the bearing core 7 substantially at the peripheral side, the recess 9 produces a gap in the side of the bearing bush through which the connection portion 11 of the support member 2 can be introduced as far as the bearing core 7. Thus, in the example shown, recess 9 may extend through bearing bush 8 until bearing core 7. In another example, recess 9 may extend past the location of bearing core 7, and through the width of bearing bush 8. In this manner, a connection portion 11 of the support member 2 extends through recess 9 in wall 10 of the bearing bush 8 such that support member 2 may be connected to bearing core 7 via the connection portion 11 and connector c3.

FIG. 2 depicts an example coupling of torque support 1 within a vehicle. As such, components previously introduced in FIG. 1 are numbered similarly in FIG. 2 and not reintroduced. The cutout of a vehicle shown in FIG. 2 comprises a drive motor 12 which is arranged inside vehicle structure 13. Torque support 1 shown inside the dashed circle is connected to drive motor 12 at a second end "B" via attachment bracket 3 and associated connectors c2. First end "A" of torque support 1 is fixed to a connection region 14 of the vehicle structure 13. In this non-limiting example, connection region 14 is part of an auxiliary frame 15 of the vehicle structure 13, wherein auxiliary frame 15 extends in parallel with an antiroll bar 16 of a chassis of the vehicle (not illustrated in detail).

Connection region 14 is depicted in the form of a cylindrical opening in FIG. 2. In other examples, connection region 14 may be a circular opening. Bearing 6 of torque support 1 may be placed within the cylindrical opening of connection region 14. In this way, the support member 2 of the torque support 1 can be supported with respect to the connection region 14 of the vehicle structure 13. An additional recess 17 (not visible in FIG. 2) may be provided in the auxiliary frame 15 so that the support member 2 can be arranged within the bearing core 7 of the bearing 6. Thus, during assembly, bearing 6 can be arranged first in the connection region 14. Next, the first end A of support member 2 can be introduced through the additional recess 17 in the auxiliary frame 15, past the recess 9 in bearing bush 8, and as far as the bearing core 7 within bearing bush 8. Finally, the support member 2 can be connected to the bearing core 7 (and bearing 6) via connector c3.

Figure 3:
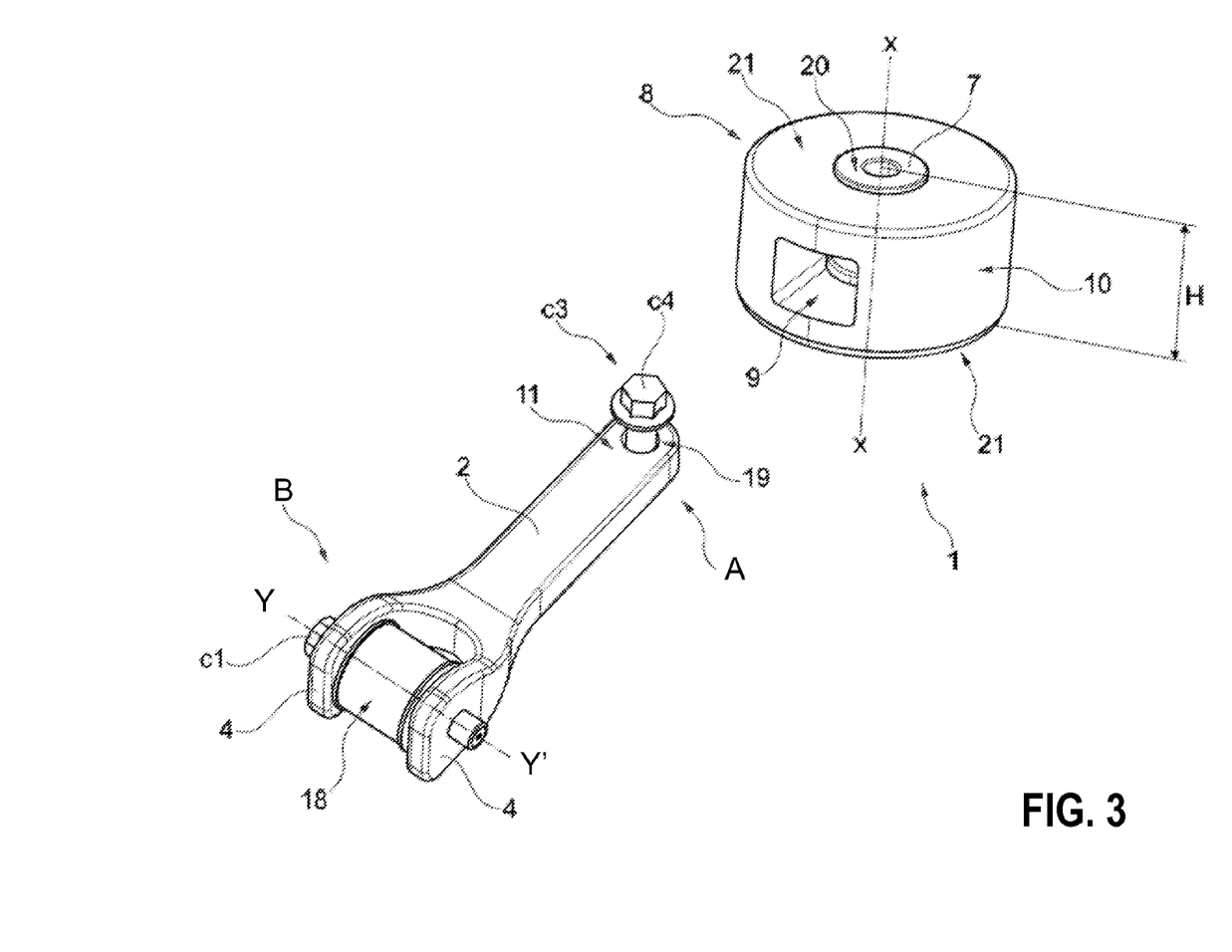
FIG. 3 is a magnified modified perspective view of the torque support from FIG. 1.

Turning now to FIG. 3, it depicts additional details of the torque support 1 according to the invention disclosure. Herein, the attachment bracket 3 of FIGS. 1 and 2 has been omitted, offering a better view of the two members 4 at the second end B of the support member 2. As such, components previously introduced in FIGS. 1 and 2 are numbered similarly in FIG. 3 and not reintroduced. An inner bearing 18 is coupled to second end B of the support member 2 between the members 4 and may be further coupled to region 5 of attachment bracket 3 (FIG. 1). In one example, second end B of the support member 2 may be designed such that inner bearing 18 is integrated within second end B. In another example, inner bearing 18 may be integrated into attachment bracket 3, specifically within region 5.

Thus, torque support 1 may be connected to drive motor 12 by coupling support member 2 to attachment bracket 3 via inner bearing 18 and connector c1. Connector c1 may join members 4 to region 5 of attachment bracket 3 via inner bearing 18. Additional connectors c2 (shown in FIGS. 1 and 2) may be used to couple attachment bracket 3 to the drive motor 12.

Inner bearing 18, and consequently, support member 2, may be rotatable around axis Y-Y'. In one example, inner bearing 18 may be a rubber/metal bearing. In another example, inner bearing 18 may have a non-metal internal portion (not shown in figure). The internal portion may be in the form of a pipe to allow a connector to be placed within. Further, the internal portion may be supported in a resilient ring inside the opening. In addition, the internal portion in the opening at the second end of the support member may be made of vulcanized material to provide vibration dampening effects.

Connection portion 11 at first end A of the support member 2 may have a through-hole 19 to receive connector c3. In one example, connector c3 may be a bolt with a bolt head c4. Bolt head c4 may be supported in the assembled state on a top side 20 of the bearing core 7 as shown in FIGS. 1 and 2. In another example, connector c3 may be a screw. Other embodiments may use different types of fasteners to couple support member 2 to bearing core 7.

It will be appreciated from FIG. 3 that recess 9 in the bearing bush 8 may extend through the wall 10 as far as the bearing core 7. Further, recess 9 lies parallel to and in-between surfaces 21 of the bearing bush 8. Thus, recess 9 is spaced apart from both surfaces 21 of the bearing bush 8. In the example shown, surfaces 21 may include an upper (or top) surface and a lower (or bottom) surface of bearing bush 8. Thus, recess 9 is spaced between the upper and lower surfaces of bearing bush 8. Bearing bush 8 may extend in the longitudinal direction "x" of the bearing core 7 to a height "H" which substantially corresponds to a length "L" of the bearing core 7 in the longitudinal direction "x" (FIG. 4). Thus, bearing bush 8 extends in height "H" over the entire length "L" of the bearing core encompassing the bearing core. In other examples, the bearing core 7 may be longer (or taller) relative to bearing bush 8. Herein, bearing core may have a slight projection relative to the upper and lower surfaces 21 of the bearing bush 8. Thus, bearing bush 8 extends in terms of its height over an entire length of the bearing core 7. In other words, an external outer face of the bearing core can be covered completely (or surrounded completely) with the wall of the bearing bush except in the region of the recess 9.

FIG. 4 shows a view of the bearing core 7 of torque support 1. As such, parts previously introduced in FIGS. 1, 2 and 3 are numbered similarly in FIG. 4 and not reintroduced. Bearing core 7 is formed as a single piece and has a cylindrical form with a length "L" in the longitudinal direction "x". Further, bearing core 7 includes a receiving channel 22 which extends in the longitudinal direction "x" and receives connector c3 (not shown). The receiving channel 22, in one example, may be a through-opening which extends through and over the entire length of the bearing core 7. In another embodiment, the receiving channel 22 may extend only partially through the bearing core, for example, in the form of a blind hole. By extending partially through bearing core 7, receiving channel 22 may be better protected from fluids and/or foreign bodies being introduced within.

Bearing core 7 comprises an outer surface 23 which has a notch 24 that is arranged transversely relative to the receiving channel 22. In the example shown, notch 24 may project deep into the bearing core 7 such that it surrounds a portion of the receiving channel 22 and extends beyond receiving channel 22. By extending notch 24 past receiving channel 22, there may be sufficient space to accommodate connection portion 11 of support member 2 within bearing core 7. However, notch 24 may not extend through the bearing core 7 across its entire width. In other examples, the notch may stop at or about receiving channel 22.

Support member 2 may be connected to bearing core 7 via notch 24. Connection portion 11 at first end A of the support member 2 can be arranged through recess 9 of bearing bush 8, via notch 24 in the bearing core 7. This arrangement may be made such that through-hole 19 in connection portion 11 of the first end A of support member 2 is aligned with receiving channel 22 of bearing core 7.

As shown in FIG. 4, notch 24 may divide the bearing core 7 into regions including a connection web 25 that may be formed in the plane of notch 24. Accordingly, the bearing core 7 may be subdivided by the notch 24 into a first (or lower) core portion 26 and a second (upper) core portion 27 in addition to connection web 25. The first (or lower) and second (or upper) core portions may be spaced apart from each other by the notch 24 in the longitudinal direction "x" of the bearing core 7. The first (or lower) core portion and the second (or upper) core portion are consequently connected to each other via the connection web 25.

Connection web 25 may be a materially uniform and integral component of the bearing core 7. Connection web 25 may be formed during production when notch 24 is placed into bearing core 7. In the example shown, connection web 25, first core portion 26 and second core portion 27 are formed from the same material and may be formed integrally to create a one-piece bearing core 7. In one example, the bearing core 7 may be molded from an initially unshaped material. In another example, bearing core 7 may be formed by processing of an initially unshaped material and removing swarf and chips. Further, bearing core 7 may be produced from a material capable of resilient deformation. In one example, the material used for the bearing core may be an elastomer. In another example, a thermoplastic material may be used for forming the bearing core. Further, in other embodiments, connection web 25 may be produced from a different material. Thus, mixed forms may be possible in relation to the material used for the first core portion 26, the second core portion 27 and connection web 25.

Turning now to FIGS. 5, 6 and 7, the figures depict longitudinal sections of the torque support 1 through the bearing 6. Each figure portrays a different embodiment of the bearing and bearing core. Further, components previously introduced in FIGS. 1, 2, 3, and 4 are numbered similarly in FIGS. 5, 6, and 7, and are not reintroduced.

FIG. 5 shows support member 2 connected to bearing 6 at first end A. Support member 2 may be coupled to an attachment bracket (not shown) at the second end B via inner bearing 18. Inner bearing 18 has a through-opening 28 for receiving connector c1 (not shown) that will couple the attachment bracket to support member 2. Support member 2 may be attached to bearing 6 at first end A. As shown in FIG. 5, support member 2 is arranged with connection portion 11 fitted through the recess 9 in the bearing bush 8 and in the notch 24 of the bearing core 7 into the bearing core 7. Support member 2 may be positioned such that through-hole 19 in the first end A is aligned with receiving channel 22 in the bearing core 7. Connector c3 may then be placed through receiving channel 22 of the bearing core 7 and into through-hole 19 of support member 2. Connector c3 may be tightened until bolt head c4 comes to rest on a portion of the top side 20 of the bearing core 7.

In the example shown in FIG. 5, through-hole 19 of support member 2 has an inner thread 29 while connector c3 comprises an outer thread 30 in a corresponding portion along its length. When connector c3 is tightened, inner thread 29 of the support member 2 and outer thread 30 of connector c3 may engage with each other at least partially. Thus, support member 2 and the second (or upper) core portion 27 of the bearing core 7 may be forced against each other. Herein, as connector c3 is tightened, friction between support member 2 and second (or upper) core portion of the bearing core 7 may be increased in a first plane M1. Herein, the increased friction is limited to a single contact plane between the bearing core and the support member.

Turning now to FIG. 6, it shows a similar arrangement of support member 2 within bearing 6 as FIG. 5. However, connection web 25 in FIG. 6 is substantially narrower than that of FIG. 5. By using a narrower connection web, resilient deformation of the connection web may occur when connector c3 is tightened. Resilient (or elastic) deformation of the connection web may enable relative displacement of the two core portions 26 and 27 of the bearing core 7 providing improved clamping action within the bearing core 7. The example shown in FIG. 6 features an inner thread only in a lower portion of the receiving channel 22 of the bearing core 7 unlike FIG. 5 wherein the inner thread is within the through-hole at first end A of support member 2.

FIG. 6 portrays support member 2 arranged with first end A within bearing 6. Support member 2 may be positioned through recess 9 of bearing bush 8 into notch 24 of bearing core 7. Further, through-hole 19 at the first end A of support member 2 may be aligned with receiving channel 22 of bearing core 7. In the example shown in FIG. 6, a portion of receiving channel 22 within the first (or lower) core portion 26 of bearing core 7 has an inner thread 31. The portion of receiving channel 22 with an inner thread may be longer or shorter in different embodiments. Connector c3 has an outer thread 33 which may be located on the lower end of connector c3 corresponding to the region of the inner thread in receiving channel 22 within first (or lower) core portion 26. Herein, outer thread 33 of connector c3 and inner thread 31 of receiving channel 22 may engage with each other as connector c3 is tightened, and spacing between the top side 20 of the second core portion 27 and the first core portion 26 of the bearing core 7 may be reduced. A clamping action may be produced which increases friction in two planes M1 and M2 between support member 2 and the bearing core 7.

Thus, a secure connection may be generated between the support member 2 and the bearing core 7 inside the notch 24 by tightening connector c3 until connection web 25 is resiliently deformed.

By forming the bearing core into two core portions that may be displaceable relative to each other via a resilient deformation of the connection web, an improved clamping action may be advantageously achieved between the two core portions in the notch of the bearing core if they are moved against each other, for example, via a connector. Thus, the connection web provides a connection between the two core portions but also allows corresponding degrees of freedom in relation to the position of the core portions relative to each other. Further, when a connector in the shape of a rod (such as a bolt) is used, the degree of freedom between the two core portions is reduced substantially as the two core portions approach each other upon tightening.

Elastic deformation of the connection web may depend upon the construction of the connection web and the material selected for the bearing core. For example, the connection web may be constructed so as to be sufficiently narrow that it can be deformed in a reversible manner (or elastically) as a result of the resilient deformability of the material used. The connection web may also be in the form of a linear bearing. However, the materially uniformly integral construction of the connection web together with the two core portions of the bearing core allows simpler and cost-effective production.

Turning now to FIG. 7, it depicts an example of a torque support comprising a bearing core with a breakable connection web. In this example, the connection web 25 may deform plastically or may break when the connector c3 is tightened.

Support member 2 is shown arranged with first end A within bearing 6 in FIG. 7. Connection portion 11 of support member 2 may be positioned through recess 9 of bearing bush 8 into notch 24 of bearing core 7. Further, through-hole 19 at the first end A of support member 2 may be aligned with receiving channel 22 of bearing core 7. The example shown in FIG. 7 is similar to the example of FIG. 6 in that a portion of receiving channel 22 within the first (or lower) core portion 26 of bearing core 7 has an inner thread 31. Connector c3 has an outer thread 33 which may be located on the lower end of connector c3 corresponding to the inner thread 31 in receiving channel 22 within the first (or lower) core portion 26. Similar to the example of FIG. 6, outer thread 33 of connector c3 and inner thread 31 of receiving channel 22 of may engage with each other and as connector c3 is tightened, spacing between the top side 20 of the second (or upper) core portion 27 and the first (or lower) core portion 26 of the bearing core 7 may be reduced. Further, connection web 25 may deform plastically or may break (as shown in FIG. 7) as connector c3 is tightened allowing first core portion 26 and the second core portion 27 of the bearing core 7 to be displaced relative to each other. Thus, a sufficiently large force may be used when tightening connector c3 to break connection web 25. Furthermore, a clamping action may be produced within the bearing core which increases friction in two planes M1 and M2 between support member 2 and the bearing core 7. Thus, support member 2 may be clamped within the bearing core 7 inside the notch 24.

In combination with the resilient configuration of the bearing bush which surrounds the bearing core, the action of the connection web to prevent a relative movement of the two core portions in relation to each other may be maintained until resilient deformation and/or breaking of the connection web.

It will be appreciated that in the examples of FIGS. 6 and 7, an inner thread may not exist within through-hole 19 at first end A of support member 2. Thus, outer threads on connector c3 may engage only with inner threads in the receiving channel 22 within the bearing core 7 to clamp support member 2 within bearing core 7.

It will be further appreciated that clamping action produced between support member 2 and bearing core 7 of bearing 6 is based on a shearing stress of connector c3 in the examples shown above. Connector c3 may be positioned through receiving channel 22 and through-hole 19 such that an alignment between support member 2 and bearing core 7 is retained. In one example, connector c3 may have an upper region with an outer diameter that is greater than the inner diameter of receiving channel 22. Herein, connector c3 may be introduced into the receiving channel 22 and through-hole 19 until the upper region of connector c3 is positioned extending above a portion of the bearing core.

In another example, connector c3 may include a longer shaft such that its end portion may project out of receiving channel 22 of the bearing core 7. The portion of connector c3 that projects at the lower end of receiving channel 22 may be secured via a split pin. In another example, the portion of connector c3 projecting from the lower end of receiving channel 22 may have an outer thread such that a nut with an inner thread may be screwed onto it. Thus, friction between the connection portion 11 of the support member 2 and the bearing core 7 may be increased by clamping action produced during tightening of the nut at the lower portion of connector c3 and the upper region of connector c3.

By providing an inner thread either in through-hole 19 at first end A of support member 2 or in the lower portion of bearing core 7, connector c3 may be rotated about the longitudinal axis "x".

Thus, a torque support providing improved clamping action may be used for reducing engine roll. The torque support includes a support member connected to a vehicle structure at a first end via a bearing, the bearing comprising a bearing bush encompassing a one-piece bearing core, and the bearing core having a notch that subdivides the bearing core into a deformable, connection web, an upper bearing core portion, and a lower bearing core portion. Further, the support member may be positioned through a recess of the bearing bush in the notch of the bearing core such that a through-hole at the first end of the support member is aligned with a receiving channel in the bearing core. A connector may be placed within the receiving channel of the bearing core and the through-hole at the first end of the support member, and the upper bearing core portion and the lower bearing core portion of the bearing core may be displaced relative to each other upon tightening the connector. The deformable connection web may be resiliently deformed when the upper bearing core portion and the lower bearing core portion of the bearing core are displaced relative to each other when the connector is tightened. In other words, the upper bearing core portion and the lower bearing core portion are capable of being displaced relative to each other because of resilient deformation of the connection web. In one example, the deformable connection web may be broken when the upper bearing core portion and the lower bearing core portion of the bearing core are displaced relative to each other upon tightening the connector. This broken connection web allows improved clamping action between the support member and the bearing core. Finally, a second end of the support member of the torque support may be attached to a drive motor via an inner bearing.

In this way, using a one-piece bearing that includes a one-piece bearing core surrounded by a resilient bearing bush ensures that the bearing core is positioned in a stable manner to receive a first end of the support member. Hence, complex provisions to help orientate the bearing core within the bearing bush may be dispensed with. Further, producing the single piece bearing may be simpler and may reduce expenses. The one-piece bearing may be more compact allowing a reduction in its structural height allowing the torque support to be affixed in a vehicle structure with a smaller opening. Furthermore, by using a bearing core made of resiliently deformable material, the support member may be held more securely within the bearing. Overall, the torque support as described herein may provide a reduction in costs, improved clamping action and reduced assembly time.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A torque support for a drive motor in a vehicle structure comprising:
a support member connected to the vehicle structure via a bearing comprising a bearing core surrounded by a bearing bush, the bearing bush having a recess, and the bearing core including a receiving channel for a connector, a notch extending transversely relative to the receiving channel, and a connection web formed in a plane of the notch creating a first core portion and a second core portion of the bearing core such that the second core portion is spaced apart from the first core portion by the notch, and the second core portion is displaceable relative to the first core portion via one of resilient deformation of the connection web and breaking of the connection web.

2. The torque support of claim 1, wherein the bearing bush is of cylindrical form and wherein the recess is arranged in a wall of the bearing bush such that the recess is spaced between upper and lower surfaces of the bearing bush.

3. The torque support of claim 1, wherein the bearing core is of cylindrical form, and wherein the bearing bush extends in terms of its height over an entire length of the bearing core.

4. The torque support of claim 1, wherein the bearing is arranged at a first end of the support member, and wherein the support member has an inner bearing at a second end, the inner bearing connecting the support member to the drive motor.

5. The torque support of claim 4, wherein the first end of the support member has a through-hole having an inner thread, and wherein the through-hole is provided for receiving the connector so that the inner thread of the support member is brought into engagement with an outer thread of the connector.

6. The torque support of claim 1, wherein the receiving channel of the bearing core has an inner thread for receiving the connector such that the inner thread of the bearing core is brought into engagement with an outer thread of the connector.

7. The torque support of claim 6, wherein the receiving channel of the bearing core has an inner thread in the first core portion alone.

8. A method for attaching a torque support to a structure of a vehicle comprising:
arranging a first end of a support member of the torque support in a notch of a bearing core via a recess of a bearing bush;
positioning the support member such that a through-hole in the first end of the support member is aligned with a receiving channel in the bearing core;
placing a connector into the receiving channel in the bearing core and the through-hole in the first end of the support member; and
tightening the connector until a connection web in the bearing core is resiliently deformed and the support member is clamped within the bearing core.

9. The method of claim 8, further comprising attaching the torque support to a drive motor of the vehicle by connecting a second end of the support member of the torque support via an inner bearing and an attachment bracket to the drive motor.

10. The method of claim 8, wherein tightening the connector until the connection web in the bearing core is resiliently deformed further comprises breaking the connection web.

11. The method of claim 8, wherein the bearing bush surrounds the bearing core, and wherein the connector has an outer thread on its surface.

12. The method of claim 11, wherein the receiving channel in the bearing core has an inner thread.

13. A system comprising:
a torque support including a support member connected to a vehicle structure at a first end via a bearing, the bearing comprising a bearing bush encompassing a one-piece bearing core, and the bearing core having a notch that subdivides the bearing core into a connection web, an upper bearing core portion, and a lower bearing core portion.

14. The system of claim 13, wherein the bearing bush has a recess, and wherein a first end of the support member has a through-hole.

15. The system of claim 14, wherein the support member is positioned through the recess of the bearing bush in the notch of the bearing core such that the through-hole at the first end of the support member is aligned with a receiving channel in the bearing core, and wherein a connector is placed within the receiving channel of the bearing core and the through-hole at the first end of the support member.

16. The system of claim 15, wherein the upper bearing core portion and the lower bearing core portion of the bearing core are displaced relative to each other by tightening the connector.

17. The system of claim 16, wherein the connection web is resiliently deformed when the upper bearing core portion and the lower bearing core portion of the bearing core are displaced relative to each other upon tightening the connector.

18. The system of claim 16, wherein the connection web is broken when the upper bearing core portion and the lower bearing core portion of the bearing core are displaced relative to each other upon tightening the connector.

19. The system of claim 16, wherein a second end of the support member of the torque support is attached to a drive motor via an inner bearing and an attachment bracket.

\* \* \* \* \*